Jan. 30, 1962   O. D. HITT ET AL   3,018,673
TRANSMISSION
Filed Jan. 13, 1958
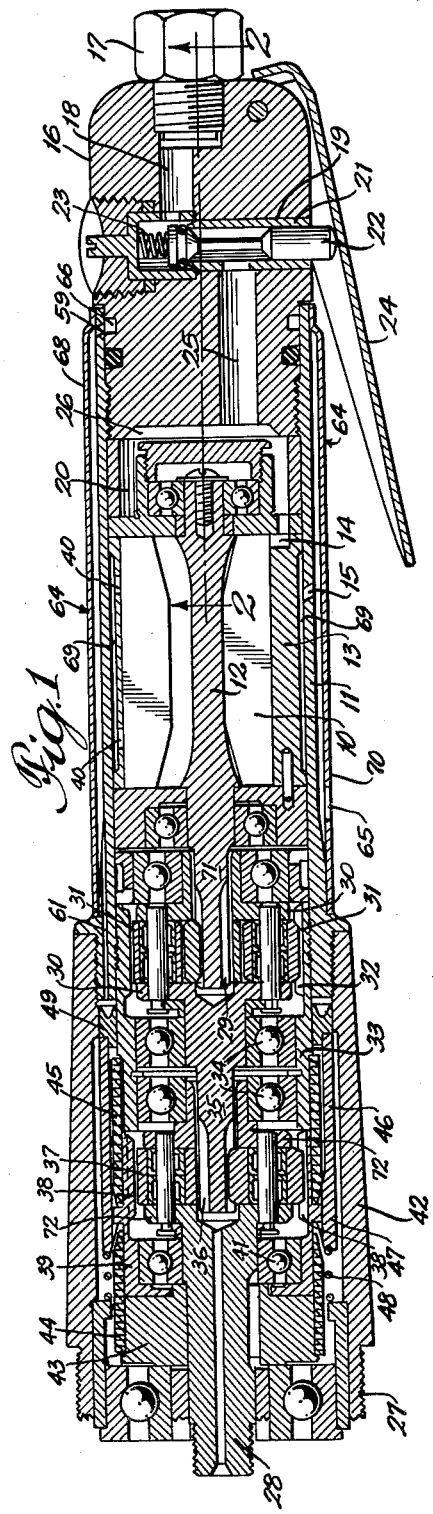
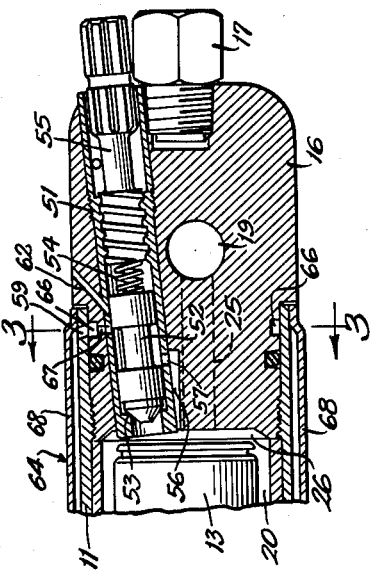
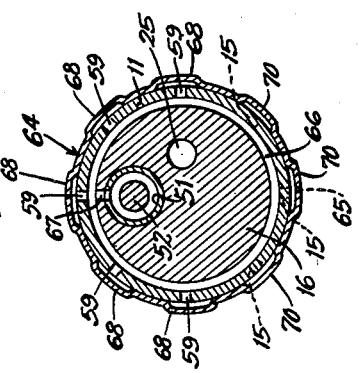
INVENTORS:
Otis D. Hitt,
Elwood P. Knapp,
Leonard L. Johnson
and Robert A. Rosenblum,
BY Bair, Freeman & Molinare
ATTORNEYS.

United States Patent Office 3,018,673
Patented Jan. 30, 1962

3,018,673
TRANSMISSION
Otis D. Hitt, Bryan, and Elwood F. Knapp, Brecksville, Ohio, and Leonard L. Johnson, Chicago, and Robert A. Rosenblum, Skokie, Ill., assignors, by mesne assignments, to The Aro Equipment Corporation, Bryan, Ohio, a corporation of Ohio
Filed Jan. 13, 1958, Ser. No. 708,419
3 Claims. (Cl. 74—785)

This invention relates to transmissions and more particularly to a multiple speed transmission for power tools and the like. In power tools such as wrenches screw drivers and the like, it is desirable to provide a relatively high speed—low torque driver to very rapidly take up initial relatively free movement in a nut, screw or the like, and then to change to a relatively low speed—high torque drive to provide the final tightening. The condition just referred to is true for nut setters which drive free running nuts and bolts, etc. and for drilling units which drill, for example, an aluminum-steel laminate wherein the aluminum would be drilled first. The opposite sequence would be required, namely, low speed—high torque shifting to high speed—low torque to complete the operation for unscrewing nuts and bolts, setting self-tapping screws or drilling the laminate above referred to through the steel first. In the latter operation the low speed—high torque requirement must be first met.

Transmissions as heretofore constructed have generally provided a single ratio drive or have involved relatively complex and expensive gear shifting arrangements to effect ratio changes.

It is one of the objects of the present invention to provide a transmission for power tools and the like which is relatively simple and compact in construction and which provides at least two driving ratios.

Another object is to provide a transmission in which the driving ratio through the transmission is changed in response to the driving force supplied by a motor driving the transmission.

According to one feature of the invention, a pneumatically operated motor is employed and means is provided for selecting and actuating the desired gear reduction of the transmission in response to pressure variation at the inlet to the motor. Preferably a valve is employed to control the selection and actuating means for the motor, and the valve is moved in response to pressure differential, the valve being constructed to expose a greater area to the pressure that moves it after initial opening thereof to produce a positive and rapid control action.

A further object is to provide a tranmission including one planetary gear unit, or a plurality of such units connected in series, with control means to render one or more of such units inoperative for relatively high speed drive, or to hold one or more reaction gears against reverse rotation to provide a speed reduction for low speed drive.

According to a feature of the invention the transmission is controlled by spiral coupling elements which wrap down against different sleeve elements of the transmission mechanism, and which are in turn controlled by an axially shiftable actuator. In the preferred construction the actuator is in the form of a sleeve around the gear units to produce an extremely compact and light-weight structure.

The above and other objects and features of the invention will be more readily apparent from the following description when read in connection with the accompanying drawing wherein:

FIG. 1 is a longitudinal sectional view through the driving portion of a power tool equipped with a transmission embodying our invention;

FIG. 2 is a partial sectional view similar to FIG. 1 and on the line 2—2 thereof; and FIG. 3 is a sectional view on the line 3—3 of FIG. 2.

Our power tool as shown is pneumatically operated and for this purpose includes a vane motor indicated generally at 10 which is enclosed in a cylindrical casing 11. The vane motor includes a rotor 12 carrying vanes in radial slots thereof which are rotated in a stator 13 of the motor. Air to drive the vanes and turn the rotor is supplied through an inlet port 14 at one end of the motor and the motor may exhaust through the stator 13 as at 40 into an annular space 69, then through one or more ports 15 in the casing 11 into spaces provided by flutes of a fluted shroud 64. The shroud is provided with exhaust ports 65 to atmosphere.

Compressed air is supplied for driving the motor 10 from a valve head 16 secured to one end of the casing 11 and carrying shut-off and transmission control valve mechanisms which will now be described. As shown, the air enters the valve head through a coupling 17 at the outer end thereof and flows into a bore 18 which communicates with a central double-diameter valve bore 19 in the head. The smaller end of the valve bore 19 carries a sleeve 21 fixed therein within which a spool type shut-off valve 22 fits. The spool valve is formed at one end with an enlarged head to seat against the sleeve 21 and is urged against the seat by a spring 23. To open the valve a hand lever 24 is pivoted on the valve head and engages the outer end of the valve spool 22 to unseat the valve when the lever is depressed and to allow air to pass from the bore 18 through a bore 25 into the casing 11 and through the port 14 into the vane motor. It will be seen that the air flows through a cavity 26 in the control head 16 and through an annular space 20 to enter the port 14.

The rotor 12 has a shaft 71 which projects from the end of the motor 10 opposite the control head 16 and drives any work engaging element (not shown) such as a wrench socket, drill or the like through a transmission embodying the present invention. It will be noted that the casing 11 of the motor has an outer casing 42 for enclosing our transmission assembly and forming an extension of the casing 11. The casing 42 terminates in a threaded sleeve portion 27 to which a housing for the work engaging element (not shown) may be attached. A driven shaft 28 projects from the left end of our transmission assembly to be operatively connected to the work engaging element for rotating it. The transmission of the present invention connects the rotor 12 and its shaft 71 to the driven shaft 28 which constitutes the load shaft of the present transmission.

As shown, the transmission provides two driving ratios, namely, a high speed—low torque ratio and a low speed— high torque ratio, either ratio of which may act first depending on the work being performed. The transmission, as shown, is formed of two planetary gear sets connected in series, the first gear set including a sun gear 29 formed on the rotor shaft 71 and meshing with planet pinions 31 which in turn mesh with a ring gear 32. The ring gear 32 is rigidly secured to the casing 11 and is extended in the form of a sleeve as shown at 33 in which bearings 34 are supported.

The pinions 31 are carried by a planet carrier 30 which is formed with a shaft extension 35 arranged axially of the transmission assembly and has gear teeth to provide a sun gear 36 for the second planetary gear set. The sun gear 36 meshes with planet pinions 37, which are carried by a second planet carrier 72 of the load shaft 28, and which in turn mesh with a second ring gear 38. The ring gear 38 is mounted for free rotation and is provided with a sleeve-like extension 39 by which it may be supported on a bearing 41. The entire transmission assembly is enclosed by the outer casing 42 hereinbefore mentioned.

To control the driving ratio of the transmission, a clutch and a brake are provided, either to couple the ring gear 38 of the second gear set with another element of the second gear set to prohibit speed reduction by the second gear set and thereby provide high speed drive, or to hold the ring gear 38 stationary for speed reduction of the load shaft 28. For this purpose the load shaft 28 has keyed thereto a hub 43 having an outer cylindrical surface adjacent to and coaxial with the sleeve extension 39 on the ring gear 38. A spiral wrap-down coupling element 44 overlies the hub 43 and the sleeve extension 39 of the ring gear 38 and frictionally engages the hub 43 but is normally loose on the sleeve extension 39. When the spiral coupling element 44 is pressed against the sleeve extension 39 it will wrap down on this extension and on the hub 43 to connect the ring gear 38 to the load shaft thereby prohibiting speed reduction by the second planetary gear set and causing both the shaft and the gear set to rotate as a unit.

A similar spiral wrap-down coupling element 45 overlies the ring gear 38 itself and the sleeve extension 33 of the fixed ring gear 32. The coupling element 45 normally frictionally engages the sleeve extension 33 but is loose on the ring gear 38. When the coupling element 45 is pressed against the ring gear 38 it will wrap down thereon and on the sleeve extension 33 to connect the ring gear 38 to the extension 33 and hold the ring gear 38 against reverse rotation so that it acts as a fulcrum for torque multiplication through the second plantetary gear set. At this time the load shaft speed relative to the motor speed is reduced by the first gear set and further reduced by the second gear set to provide a low speed relatively high torque drive of the load shaft.

The spiral coupling elements 44 and 45 are controlled by an actuator in the form of an axially shiftable sleeve 46 which overlies the coupling elements and terminates in a double tapered head 47 between the coupling elements. The sleeve 46 is urged to the right as shown by a spring 48 to engage the coupling element 45 so that normally the coupling element 45 is energized to connect the ring gear 38 to the stationary sleeve extension 33 and thereby hold the ring gear 38 stationary for low speed—high torque drive. Under usual operating conditions the sleeve 46 will be shifted to release the element 45 and energize the element 44 as soon as the air is admitted to the tool through the shut-off valve 22 by an annular piston 49 at one end thereof which is subject at its right-hand end to fluid pressure to shift the sleeve 46 to the left against the action of the spring 48. This releases the coupling element 45 and energizes the coupling element 44. Thus the tool will begin its operation in the high speed—low torque ratio in response to the torque of the driving motor when the initial load is free running but will start in the low speed—high torque ratio when the initial load is heavy.

The sleeve 46 may be shifted automatically as more particularly disclosed and claimed in our co-pending application, Serial No. 736,366, filed May 19, 1958, now Patent No. 2,924,114. For this purpose, as shown in FIG. 2, a control valve is provided to control the supply of fluid to the piston 49. The control valve includes a sleeve 51 fitting into a bore in the valve head 16 to receive a spool valve 52 which is normally urged against a reduced seat 53 at one end of the sleeve by a spring 54. The tension of the spring may be adjusted by an adjustable plug 55 screw-threadedly fitting into the sleeve 51. The adjustment permits the valve 52 to respond when the desired torque output conditions are encountered, at which time the speed ratio shift will occur. The plug 55 can be adjusted so that the valve can, if desired, remain at either extreme position to produce continuous high speed or continuous low speed operation.

The valve seat 53 opens into the cavity 26 through which the air supply passes to the motor 10 so that the pressure in the cavity and on the valve seat will be determined by the pressure at the motor inlet port 14. This pressure normally acts on that area of the valve plunger 52 which is exposed through the seat 53 and also in the space between the two enlargements of the spool valve 52. When the pressure thus acting on the total area of the spool valve becomes sufficient to overcome the spring 54 the valve plunger will be shifted to the right.

In its normal left-hand position the valve plunger 52 establishes fluid communication between the cavity 26 and the annular piston 49. For this purpose a passage 56 is formed around one side of the sleeve 51 and communicates through a port 57 in the sleeve and around the reduced center portion of the spool valve 52 which passages leading to the annular piston 49. As shown, these passages are formed in flutes 68 of the shroud 64 which fits tightly around the casing 11. The flutes communicate through ports 59, an annular space 66 and a port 67 with the valve 52. When the valve is in its normal high speed position, as shown in FIG. 2, air from the cavity 26 will flow through passage 56, ports 57 and 67, annular space 66 and the passages formed in the flutes 68, in addition to one or more drilled passages 61 (see FIG. 1) in the casing 11 to the piston 49. The spring 48 may be relatively light so that any pressure sufficient to operate the motor when the valve 22 is open will shift the actuator sleeve 46 to the left to energize the coupling 44 and de-energize the coupling 45. Therefore, the transmission will operate in its high speed—low torque driving condition to take up rapidly any free movement in the work engaging element to be driven.

To insure free passage of air for actuating the piston, there may be a plurality of ports 59 communicating with a plurality of passages formed by the flutes 68, as shown in FIG. 3, so that there will be no restriction of the air supply. Also, as indicated in FIGS. 1 and 3, the exhaust ports 15 in the casing 11 may communicate with passages formed by the flutes 70 which are provided with exhaust ports 65 (see FIG. 1) so that air from the motor may be exhausted freely to atmosphere.

As the free movement of the load is taken up and the torque demands increase, the hydrostatic pressure at the motor inlet will increase until it acts on the total area of the valve plunger 52 and such action becomes sufficient to overcome the spring 54. At this time the valve will move to the right and as soon as the port 57 is closed the valve will shift rapidly and positively. When so shifted the valve plunger 52 will connect the ports 59, annular space 66 and port 67 through the valve sleeve 51 to an exhaust passage 62 in the control head. This vents the pressure acting on the annular piston 49 to atmosphere and the actuator sleeve 46 will be moved to the right by the spring 48 to release the coupling element 44 and engage the coupling element 45. The ring gear 38 is thereupon disconnected from the hub 43 and is connected to the stationary sleeve extension 33 so that the double reduction, slow speed drive will be provided for the final tightening or setting operation.

Thus, the transmission ratio is changed by the pressure of the air being supplied to the motor but it is pressure differential which permits the control valve 52 to shift its position. This pressure differential is characteristic of air motors and is a function of the torque being produced at a particular instant. While the magnitude of this pressure differential may be varied by orifice sizes, its very existence is inherent in air motors wherein air consumption and speed are inverse functions of the torque being produced. Assuming the air supply from the coupling 17 as providing a constant pressure head under low torque conditions on the motor which is accompanied by high air consumption, the velocity of air flowing through bore 25, cavity 26 and port 14 will be higher than when the motor is required to produce higher torque with its accompanying lower air consumption. Thus, the pressure head is utilized to produce the required flow and the hydrostatic pressure in these passages represents the remainder of the pressure head not utilized as velocity pressure. The transmission control valve 52 responds to such hydrostatic pressure variation and its response is therefore a function of the torque produced by the motor.

It will be seen that the transmission of the present invention is extremely compact and is relatively simple. It can be arranged coaxial with the driving motor in an assembly which is relatively small and easy to handle. The energy supplied provides a constant pressure head but the control valve operation is in response to the utilization of this energy as velocity pressure or hydrostatic pressure as determined by the speed or torque requirements of the motor to drive it and effect a rapid and positive shifting of the transmission from its high speed to its low speed driving condition. The condition at which shifting occurs can easily be adjusted by means of the plug 55 which is exposed at one end of the valve head 16, and the adjustment can be carried to such an extent that the transmission will be maintained in either low speed or high speed driving condition.

The valve 52 may be replaced by external controls such as one of manual type, a timer, a fluid pressure device or the like which will provide actuating forces on the annular piston 49 to produce gear ratio changes.

The transmission described herein will respond to torque requirements regardless of the sequence demanded. The operating sequence described in the specification is for use with free running nuts and the like where first utilization of high speed—low torque is had followed by low speed—high torque. A converse sequence is also automatically attained for tapping and similar operations.

While we have shown two stages of planetary gearing only one need be provided in case the speed of the shaft 71 is satisfactory for the high speed—low torque drive of a work engaging element. In that case a single planetary gear set is utilized to obtain the desired speed reduction for low speed—high torque operation when the work requires it.

While one embodiment of the invention has been shown and described herein, it will be understood that it is illustrative only and not to be taken as a definition of the scope of the invention, reference being had for this purpose to the appended claims.

We claim:
1. A transmission for a tool or the like comprising a first planetary gear set including a sun gear connected to be driven by a motor or the like, a ring gear fixed against rotation and a planet carrier carrying pinions meshing with the sun and ring gears, a second gear set including a second sun gear connected to the first carrier, a second ring gear, and a second carrier carrying pinions meshing with the second sun and ring gears and adapted to be connected to a load, a hub on the second carrier having a cylindrical surface coaxial with and adjacent to a cylindrical surface on the second ring gear, the first and second ring gears having coaxial adjacent cylindrical surfaces spaced axially from the first named surfaces, a pair of axially spaced spiral coupling elements overlying and engageable respectively with the pairs of adjacent surfaces, and an axially movable actuator lying axially between the coupling elements and selectively engageable therewith energize said coupling elements selectively.

2. A transmission for a tool or the like comprising a housing, a planetary gear set therein including a sun gear to be connected to a motor and driven thereby, a ring gear, and a planet carrier carrying pinions meshing with the sun and ring gears and adapted to be connected to a load, a hub on said carrier having a cylindrical surface coaxial with and adjacent to a cylindrical surface on said ring gear, said ring gear and said housing having coaxial adjacent cylindrical surfaces spaced axially from the first named surfaces, a pair of axially spaced spiral coupling elements overlying and engageable respectively with the pairs of adjacent surfaces, an actuator sleeve axially shiftable, an actuator part on the sleeve lying axially between the coupling elements and selectively engageable therewith to energize said coupling elements, and means to shift said actuator sleeve.

3. A transmission comprising a first planetary gear set including a sun gear adapted for connection to a motor to be driven thereby, a ring gear fixed against rotation and a planet carrier carrying pinions meshing with the sun and ring gears, a second gear set including a second sun gear connected to the first carrier, a second ring gear, and a second carrier carrying pinions meshing with the second sun and ring gears and adapted to be connected to a load, a hub on the second carrier having cylindrical surface coaxial with and adjacent to a cylindrical surface on the second ring gear, the first and second ring gears having coaxial adjacent cylindrical surfaces spaced axially from the first named surfaces, a pair of axially spaced spiral coupling elements overlying and engageable respectively with the pairs of adjacent surfaces, an actuator sleeve around the gear sets and axially shiftable relative thereto, and an actuator part on the sleeve lying axially between the coupling elements and selectively engageable therewith to energize the coupling elements.

References Cited in the file of this patent
UNITED STATES PATENTS

| | | |
|---|---|---|
| 2,106,603 | Jacques | Jan. 25, 1938 |
| 2,481,997 | Haigh et al. | Sept. 13, 1949 |
| 2,484,364 | Whitledge | Oct. 11, 1949 |
| 2,564,271 | Millns | Aug. 14, 1951 |
| 2,649,817 | La Voque | Aug. 25, 1953 |
| 2,701,974 | Miller | Feb. 15, 1955 |
| 2,749,772 | O'Malley | June 12, 1956 |
| 2,868,037 | Hindmarch | Jan. 13, 1959 |
| 2,870,655 | Rockwell | Jan. 27, 1959 |
| 2,884,812 | Reis | May 5, 1959 |
| 2,885,909 | Mooney et al. | May 12, 1959 |
| 2,924,114 | Hitt et al. | Feb. 9, 1960 |